United States Patent
Molev-Shteiman

(10) Patent No.: US 6,289,040 B1
(45) Date of Patent: Sep. 11, 2001

(54) HIERARCHICAL DELAY LOCK LOOP CODE TRACKING SYSTEM

(75) Inventor: Arkady Molev-Shteiman, Bnai Brak (IL)

(73) Assignee: Infineon Technologies Development Center Tel Aviv Ltd.

( * ) Notice: Subject to any disclaimer, the term of this patent is extended or adjusted under 35 U.S.C. 154(b) by 0 days.

(21) Appl. No.: 09/154,033

(22) Filed: Sep. 16, 1998

(51) Int. Cl.$^7$ ................................................ H04K 1/00
(52) U.S. Cl. ........................ 375/149; 375/150; 375/367
(58) Field of Search ................................ 375/140, 148, 375/149, 150, 152, 367, 316; 370/479, 503; 342/357.12; 327/149

(56) References Cited

U.S. PATENT DOCUMENTS

| | | | |
|---|---|---|---|
| 4,894,842 | * 1/1990 | Broekhoven et al. | 375/150 |
| 5,390,207 | 2/1995 | Fenton et al. | 375/149 |
| 5,398,034 | * 3/1995 | Spiker, Jr. | 342/357 |
| 5,414,729 | 5/1995 | Fenton | 375/149 |
| 5,495,499 | 2/1996 | Fenton et al. | 370/479 |
| 5,966,403 | * 10/1999 | Pon | 375/148 |
| 5,969,551 | * 10/1999 | Fujioka | 327/149 |

OTHER PUBLICATIONS

Spiker, "GPS Structure and Performance Characteristics", *Navigation*, 25(2): 139–145, 1978.

* cited by examiner

Primary Examiner—Stephen Chin
Assistant Examiner—Chieh M. Fan
(74) Attorney, Agent, or Firm—Mark M. Friedman

(57) ABSTRACT

A receiver of signals modulated by pseudorandom noise that uses a hierarchy of delay lock loops (DLLs) to maintain code lock. Each DLL in the hierarchy produces a control signal represenative of a timing mismatch between the incoming signal and an internally generated pseudorandom noise code, preferably by correlating the incoming signal with early and late instances of the code and subtracting the late correlation from the early correlation. The early correlation is advanced relative to the late correlation by successively shorter spacings in successively lower DLLs in the hierarchy. In each DLL, the control signal is transformed to a code phase signal for adjusting the timing of the code generator. In the lower DLLs, this code phase signal is compared to the delay signal of the immediately higher DLL and adjusted accordingly. This receiver combines the immunity to random noise, associated with short spacings between the early and late correlations, with the immunity to sudden receiver motion associated with long spacings.

18 Claims, 8 Drawing Sheets

HIERARCHICAL DELAY LOCK LOOP CODE TRACKING SYSTEM

FIELD AND BACKGROUND OF THE INVENTION

The present invention relates to receivers of signals modulated by pseudorandom noise, such as the receivers used in navigation systems, and, more particularly, to a receiver based on a hierarchy of delay lock loops to maintain code lock.

Radio navigation systems are used for providing geographic location and time information. Examples of these systems include the United States' Global Positioning System (GPS) and the Russian Global Navigation System (GLONASS). These systems rely on satellites in orbit around the Earth. They allow the derivation of precise navigation information including three-dimensional position, velocity and time. Normally, reception of signals from at least four satellites is required for precise location determination on four dimensions (latitude, longitude, altitude and time). Once the receiver has measured the respective signal propagation delays, the range to each satellite is calculated by multiplying each delay by the speed of light. Then the location and time are found by solving a set of four equations that incorporate the measured ranges and the known locations of the satellites. The highly precise capabilities of the system are maintained by means of atomic clocks on board the satellites and by ground tracking stations which continuously monitor and correct satellite clock and orbit parameters.

In the GPS system, each satellite transmits two direct-sequence-coded spread spectrum signals: an L1 signal at a carrier frequency of 1.57542 GHz and an L2 signal at a carrier frequency of 1.2276 GHz. The L1 signal consists of two phase-shift keyed (PSK) spread-spectrum signals modulated in phase quadrature: the P-code signal ("P" stands for "precise") and the C/A-code signal (C/A stands for "Coarse/Acquisition"). The L2 signal contains only the P-code signal. The P and C/A codes are repetitive pseudorandom bit sequences which are modulated onto the carriers. These bits are called "chips" in spread spectrum parlance. The clock-like nature of these codes is used by the receiver in making time delay measurements. The codes of each satellite are unique, allowing the receiver to distinguish between signals, from the various satellites, that share a common carrier frequency. Also modulated onto each carrier is a 50 bit-per-second data stream which, for each satellite, contains information about system status and satellite orbit parameters which are needed for the navigation calculations. The P-code signals are encrypted, and are intended to be decrypted only by classified users. The C/A signals are available to all users.

The operations performed in a GPS receiver are for the most part typical of those performed in any direct-sequency spread spectrum receiver. The spreading effect of the pseudorandom code modulation must be removed from each signal by multiplying by a time-aligned, locally generated copy of its code, in a process known as despreading. Because the appropriate time alignment, or code phase, is not known at receiver startup, it must be sought during the initial acquisition stage. Once found, proper code time-alignment, also called "code lock", must be maintained during the tracking phase of receiver operation, as the satellites move relative to the user.

Once despread, each signal consists of a 50 bit-per-second PSK signal at some low frequency. This frequency is uncertain because of the Doppler shift caused by relative motion between the satellite and the user, and also because of receiver local clock error. During initial signal acquisition, the signal must be sought in a frequency range which allows for this uncertainty. Once the Doppler frequency offset is determined approximately, carrier demodulation can compensate for it by digital processing means.

Most of the functions described so far are performed by digital means. After high speed A/D conversion, despreading is performed using special hardware controlled by a microcontroller. The microcontroller also performs additional digital signal processing tasks, such as data detection, timing recovery and navigation.

One mechanism commonly used for maintaining code time-alignment is the so-called "delay-lock loop" (DLL). A DLL tracking system which correlates early, current and late versions of the locally generated pseudorandom noise code signal with the received composite signal typically is used to maintain code lock in each channel. This code lock must be maintained despite multipath propagation and despite sudden motion of the receiver.

The DLL, first introduced by Spilker (J. J. Spilker Jr., "GPS Structure and Performance Characteristics", *Navigation* Vol. 25 No. 2 pp. 121–146 (1978)), is based on correlating the incoming signal with two time-shifted versions of the pseudorandom noise code generated at the receiver, an early version and a late version. FIG. 1 shows the ideal normalized correlation function between the incoming signal and the pseudorandom noise code. In FIG. 1, the abscissa is the time lag between the incoming signal and the receiver's code generator, in units of $T_c$, the code chip time. When the receiver's code generator is exactly synchronized with the incoming signal, the correlation function is almost unity. When the receiver's code generator leads or lags the incoming signal by more than $T_c$, the correlation function is almost zero. (In the GPS C/A-code signal, for example, chip "epochs" are 1023 chips long, so the correlation function is −1/1023 at leads and lags greater than $T_c$ and 1 at perfect synchrony.) In between, the correlation function is linear. In most prior art receiver architectures, the early (E) and late (L) correlation timings differ initially by $2\Delta=T_c$ as shown in FIG. 1. In particular, FIG. 1 shows the timing of the early correlation and the late correlation relative to the incoming signal when the current correlation, which is actually used to despread the incoming signal, and which is performed at a time exactly halfway between the early correlation and the late correlation, is exactly synchronized with the incoming signal, i.e., at time zero. At perfect synchrony, the difference between the early correlation and the late correlation is zero. When the current correlation leads or lags perfect synchrony, the difference between the early correlation and the late correlation is as shown by the curve labeled "k=1" in FIG. 2. This curve is produced by sliding the vertical lines labeled "E" and "L" in FIG. 1 leftward and rightward while maintaining the $2\Delta=T_c$ spacing between the two lines, and is a plot of the difference between the length of the "E" line and the length of the "L" line as a function of the time half way between the two lines. For obvious reasons, this curve is called an "S-curve". It provides a measure of the timing mismatch between the incoming signal and the receiver's code generator.

FIG. 3 is a block diagram of a coherent delay lock loop tracking system 10 of the prior art. The arrows show the direction of data flow. Pseudorandom noise code is generated by a code generator 12. An incoming signal C(t) is multiplied by this code in a current multiplier 14, an early multiplier 16 and a late multiplier 18. The code input to early multiplier 16 is advanced by Δ (block 24) relative to the code input to current multiplier 14. The code input to late multiplier 18 is delayed by Δ (block 26) relative to the code input to current multiplier 14. The outputs of early multiplier 16, current multiplier 14 and late multiplier 18 are low pass filtered (blocks 20, 21 and 22, respectively). The outputs of low pass filters 20 and 22 are correlation signals that are subtracted (block 28) to produce the corresponding S-curve value. Thus, early multiplier 16 and low pass filter 20 together constitute an early correlator; similarly, late multiplier 18 and low pass filter 22 together constitute a late correlator. The S-curve value is a control signal which is transformed by a loop filter 30 to a control voltage that is proportional to the time shift that must be applied to the code generated by code generator 12 to achieve synchrony with the input signal C(t). This control voltage is applied to a VCO 32. The output of VCO 32 is a code phase signal that drives code generator 12. The portion of delay loop tracking system 10 that constitutes the DLL proper is bounded by dashed line 34.

Loop filter 30 and VCO 32 each are characterized by one or more state variables, with the code phase itself being one of the state variables of VCO 32. At any time, the output of loop filter 30 depends on both the input from subtraction block 28 and the instantaneous values of the state variables. The state variables themselves may be dynamic functions of time, and may be set and read externally. For example, there is a realization of loop filter 30 wherein one of the state variables is equal to the Doppler frequency shift. The facility of reading from and writing to loop filter 30 and VCO 32 is represented in FIG. 3 by a triple-headed double arrow 36.

Noncoherent DLLs also are known. A noncoherent DLL is identical to DLL 34, except that the absolute values of the outputs of low pass filters 20 and 22 are subtracted in block 28.

Using a spacing $2\Delta$ equal to $T_c$ to generate the S-curve is known to offer a good tradeoff between immunity to random noise on the one hand, and immunity to receiver motion, on the other. It can be shown that the variance of the code phase due to random noise is proportional to $\Delta$. The tradeoff is that a narrow spacing makes the system more susceptible to loss of lock because of sudden receiver motion. FIG. 2 shows S-curves for $\Delta$ equal to $2^{-k}$ (k=1, 2, 3, 4 and 5). The k=1, k=2 and k=3 curves are labeled as such. Note that all five S-curves are linear, with a slope of $2/T_c$, in their respective intervals $[-\Delta,\Delta]$. The increased susceptibility to loss of lock associated with k>1 is caused by the flat portions of the corresponding S-curves. In many prior art receiver architectures, after the signal is acquired, $2\Delta$ is decreased below $T_c$ to reduce the tracking error caused by random noise, but this makes the system more vulnerable to loss of lock.

There is thus a widely recognized need for, and it would be highly advantageous to have, a system and method for maintaining code lock, in a receiver of signals modulated by pseudorandom noise, that combines the immunity to loss of lock due to receiver motion of a DLL having a wide correlation spacing with the immunity to random noise and multipath propagation of a DLL having a narrow correlation spacing.

SUMMARY OF THE INVENTION

According to the present invention there is provided a receiver for receiving an incoming signal that is modulated with a code, the incoming signal including a plurality of chips of a certain chip duration, including: a plurality of delay lock loops, one of the delay lock loops being a first delay lock loop, the delay lock loops being organized hierarchically, such that each of the delay lock loops other than the first delay lock loop has a preceding delay lock loop, each of the delay lock loops including: (a) a code generator for generating the code, (b) a mechanism for generating a control signal representative of a timing mismatch between the incoming signal and the code generated by the code generator, and (c) a mechanism for transforming the control signal into a code phase signal which is applied to the code generator to reduce the timing mismatch; and wherein, in each of the delay lock loops other than the first delay lock loop, the code phase signal is based both on the control signal and on the code phase signal of the preceding delay lock loop.

According to the present invention there is provided a method for tracking an incoming signal including a plurality of chips of a certain chip duration, including the steps of: (a) generating a plurality of instances of a code, the instances being ordered hierarchically, one of the instances being a first instance, such that for each of the instances other than the first instance, there is a preceding instance; (b) for each of the instances, producing a control signal representative of a timing mismatch between the incoming signal and the code; and (c) for each of the instances, transforming the control signal into a code phase signal, the code phase signal of each of the instances other than the first instance being based both on the control signal and on the code phase signal of the preceding instance.

The present invention achieves the stated objective by using a hierarchy of DLLs, having successively narrower correlation spacings. In all the DLLs except the one with the widest correlation spacing, the code phase obtained by VCR 32 is compared with the code phase presently being used by the DLL with the next widest correlation spacing, and adjusted accordingly. Preferably, there are four DLLs in the hierarchy, with correlation spacings $2\Delta$ of $T_c$, $T_c/2$, $T_c/4$ and $T_c/8$ respectively.

Fenton, in U.S. Pat. No. 5,414,729, also uses correlations of the incoming signal with several instances of the pseudorandom noise code, each instance shifted with respect to the incoming signal by a different fraction of $T_c$, to account for multipath distortion by fitting the various correlations to a model of the multipath distortion; but the various correlations are computed independently, and the code phase associated with one correlation is not used to constrain the code phase associated with another correlation, as in the present invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a receiver, of signals modulated by pseudorandom noise, which is more immune to various sources of error than similar prior art receivers. Specifically, the present invention can be used as a navigational receiver, for example in the GPS navigation system.

The principles and operation of a navigational receiver according to the present invention may be better understood with reference to the drawings and the accompanying description.

Figure 3:
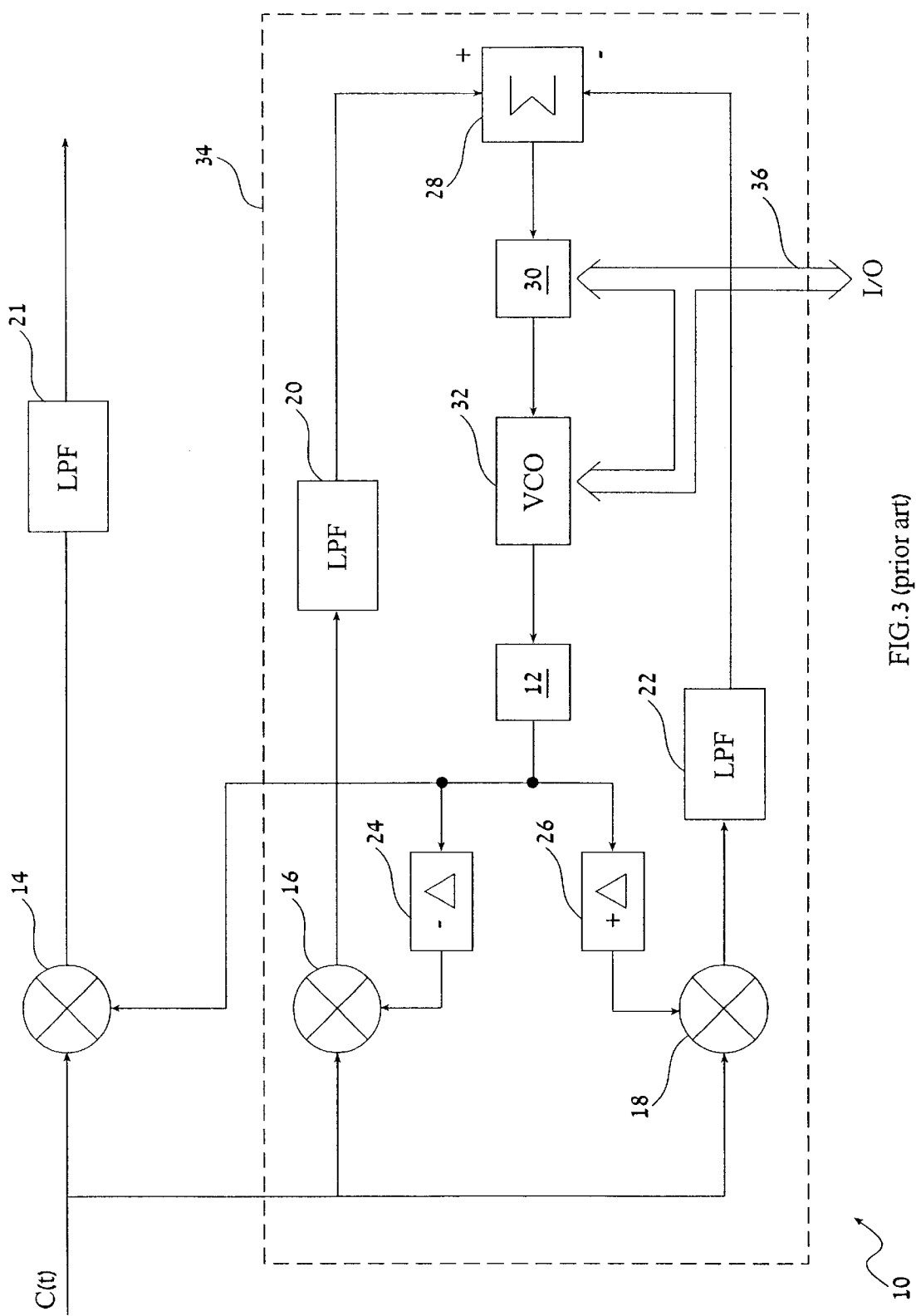
FIG. 3 is a block diagram of a prior art delay lock loop.
Figure 4:
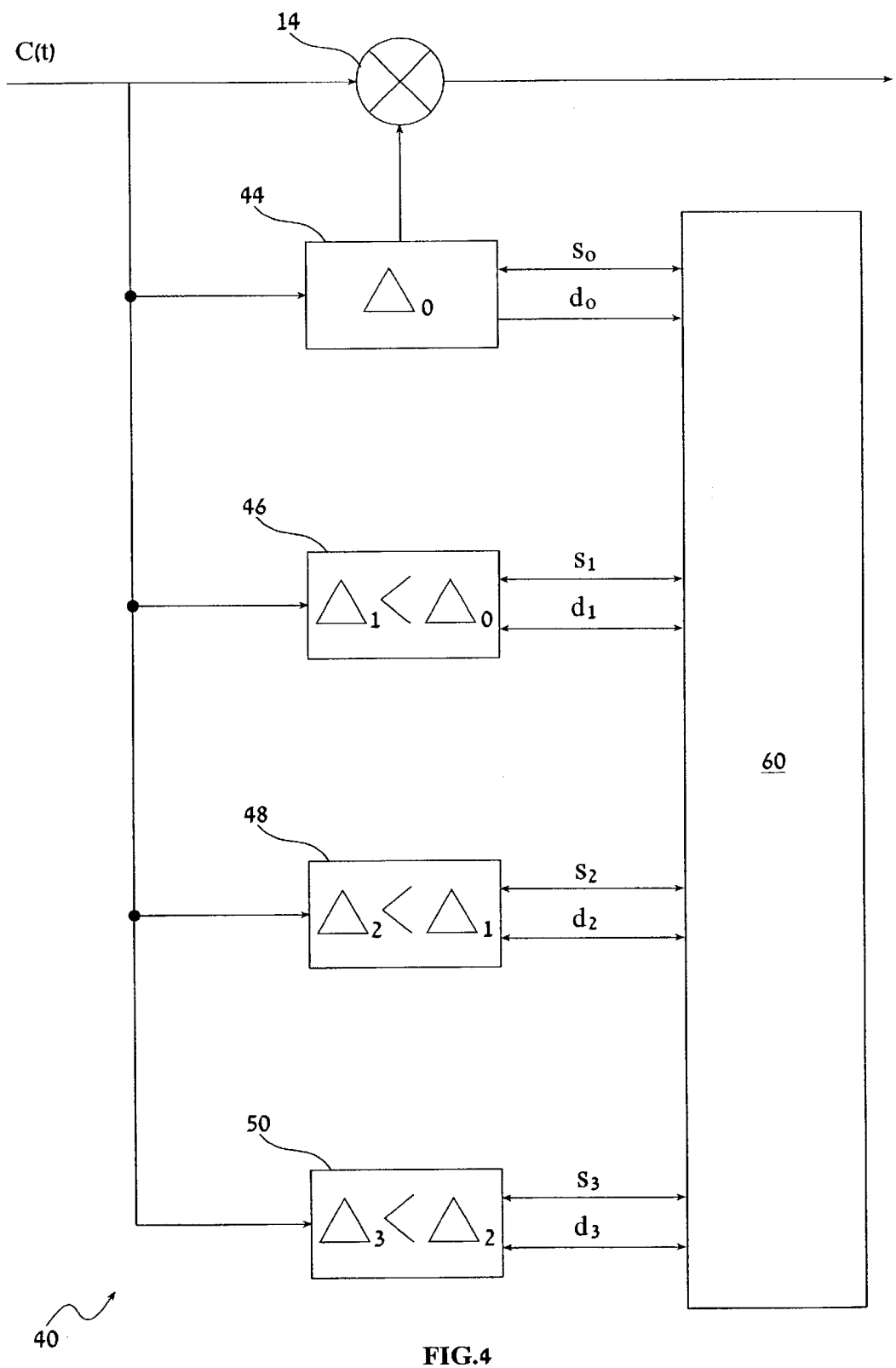
FIG. 4 is a high level block diagram of a DLL hierarchy of the present invention.

Referring again to the drawings, FIG. 4 is a high level block diagram of a hierarchical DLL tracking system 40 of the present invention, including four DLLs 44, 46, 48 and 50. Each DLL is labeled by its half correlation spacing $\Delta_k$: in DLL 44, $\Delta_0$, which typically is $T_c/2$; in DLL 46, $\Delta_1 < \Delta_0$; in DLL 48, $\Delta_2 < \Delta_1$; and in DLL 50, $\Delta_3 < \Delta_2$. The inputs to all four DLLs is the incoming signal C(t). Each of DLLs 44, 46, 48 and 50 is essentially identical to DLL 34 of FIG. 3, including facilities, represented by the double-headed arrows labeled "$s_0$", "$s_1$", "$s_2$" and "$s_3$", for exchanging state variables $S_k$ with a logic block 60. Logic block 60 also receives, from DLLs 44, 46, 48 and 50, signals $d_k$ representative of the code phases that must be applied to the code generated by code generators 12 to achieve synchrony with input signal C(t). In the simplest implementation of tracking system 40, the signals $d_k$ are the code phases themselves from VCR 32. The arrow labeled "$d_0$" is single-headed, to indicate that code phase signal $d_0$ is only output from DLL 44. The arrows labeled "$d_1$", "$d_2$" and "$d_3$" are double-headed, to indicate that for each k>0, logic block 60 compares code phase signal $d_k$ with code phase signal $d_{k-1}$ and adjusts $d_k$ accordingly.

FIG. 4 shows the output of code generator 12 of DLL 44 being input to current multiplier 14 for despreading the incoming signal C(t). The output of code generator 12 of any one of DLLs 44, 46, 48 and 50 may be used for despreading. Using the output of code generator 12 of a DLL with a wide $\Delta_k$ for despreading gives relative resistance to loss of code lock. Using the output of code generator 12 of a DLL with a narrow $\Delta_k$, for despreading gives relative resistance to random noise.

Figure 1:
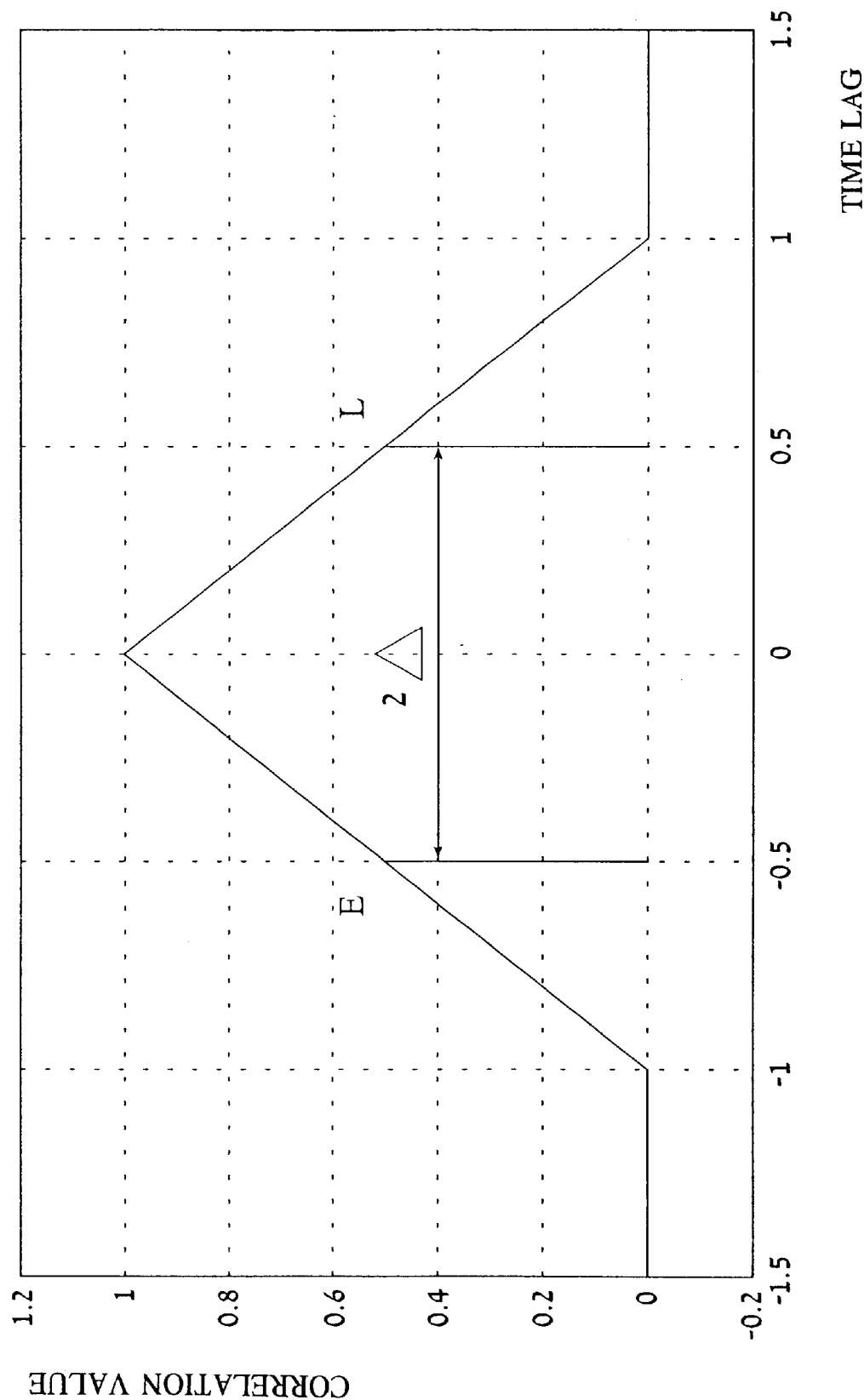
FIG. 1 is a plot of the correlation function between an incoming signal and pseudorandom noise code.
Figure 2:
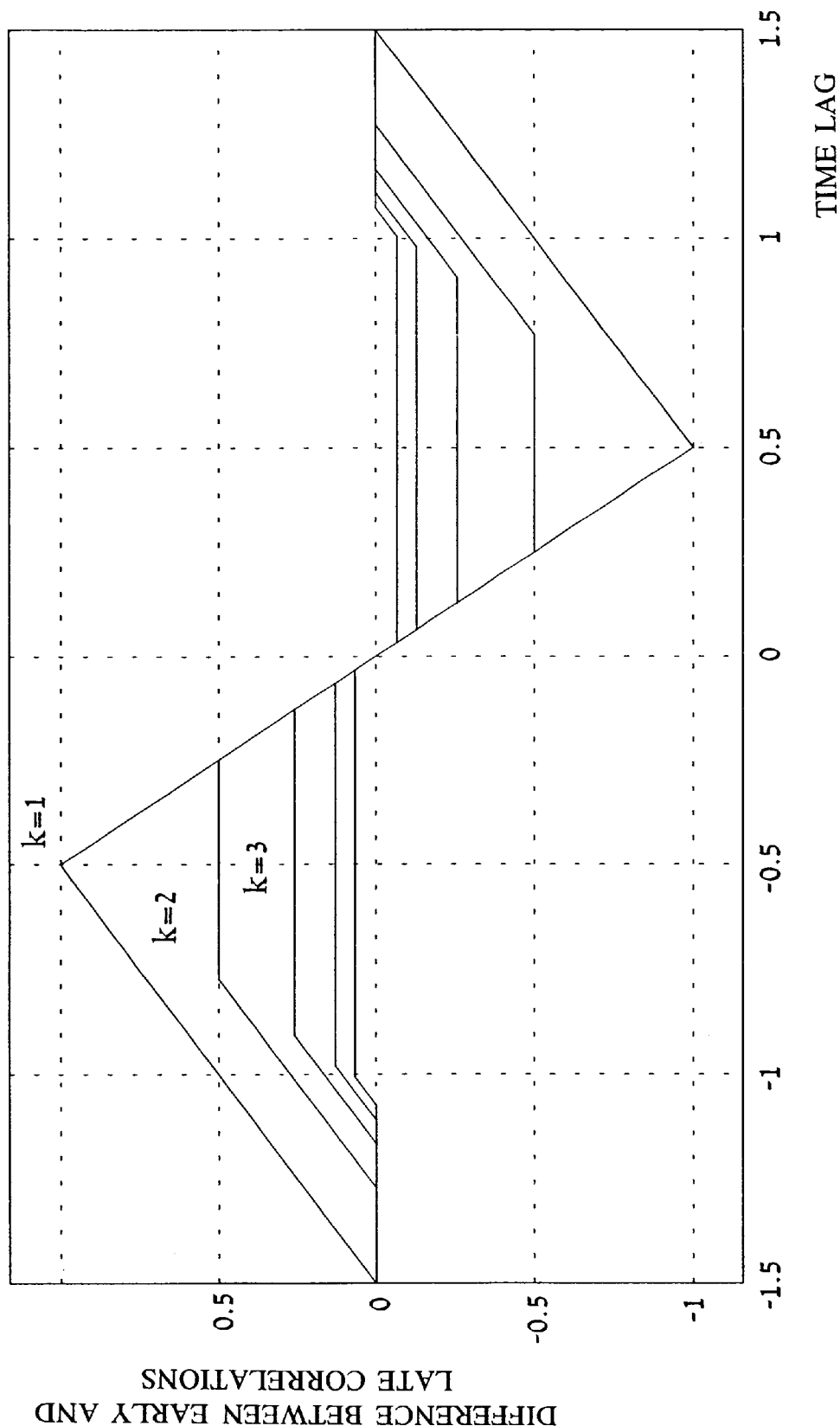
FIG. 2 is a plot of S-curves corresponding to the correlation function of FIG. 1.
Figure 5A:
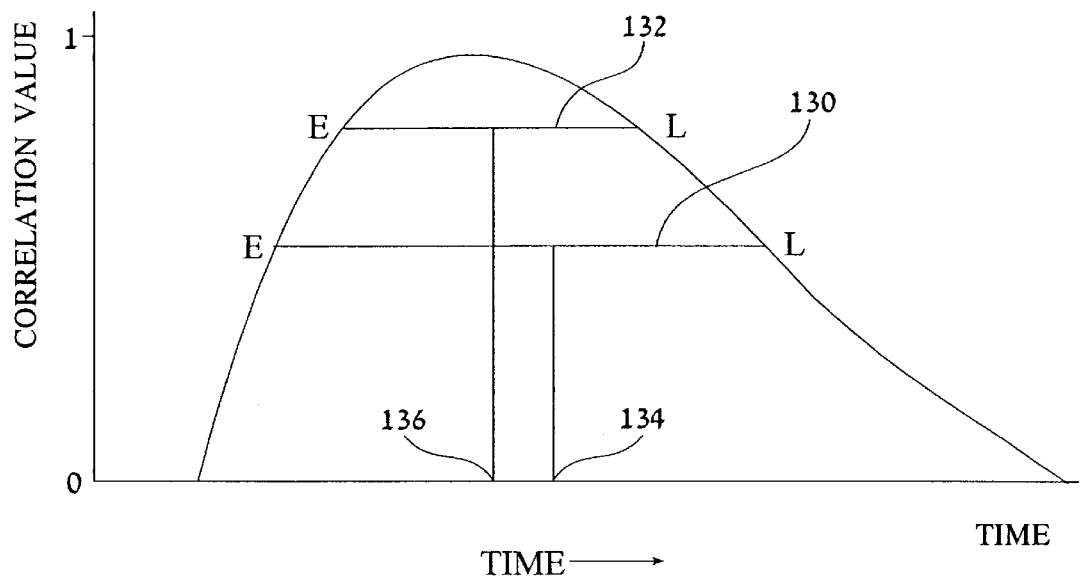
FIG. 5 illustrates the motivation of the preferred algorithm of the present invention.
Figure 5B:
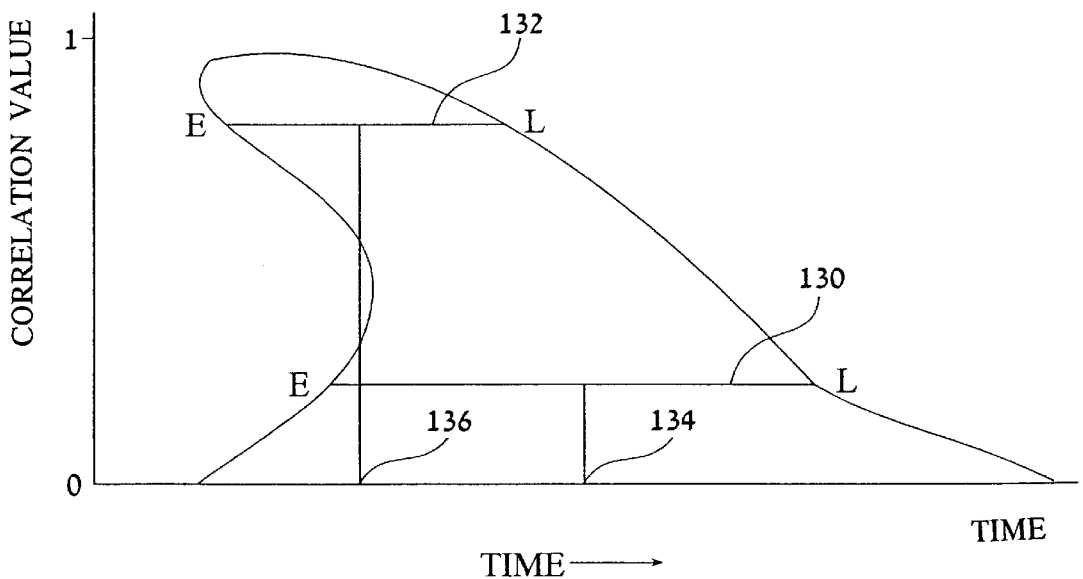
Figure 6:
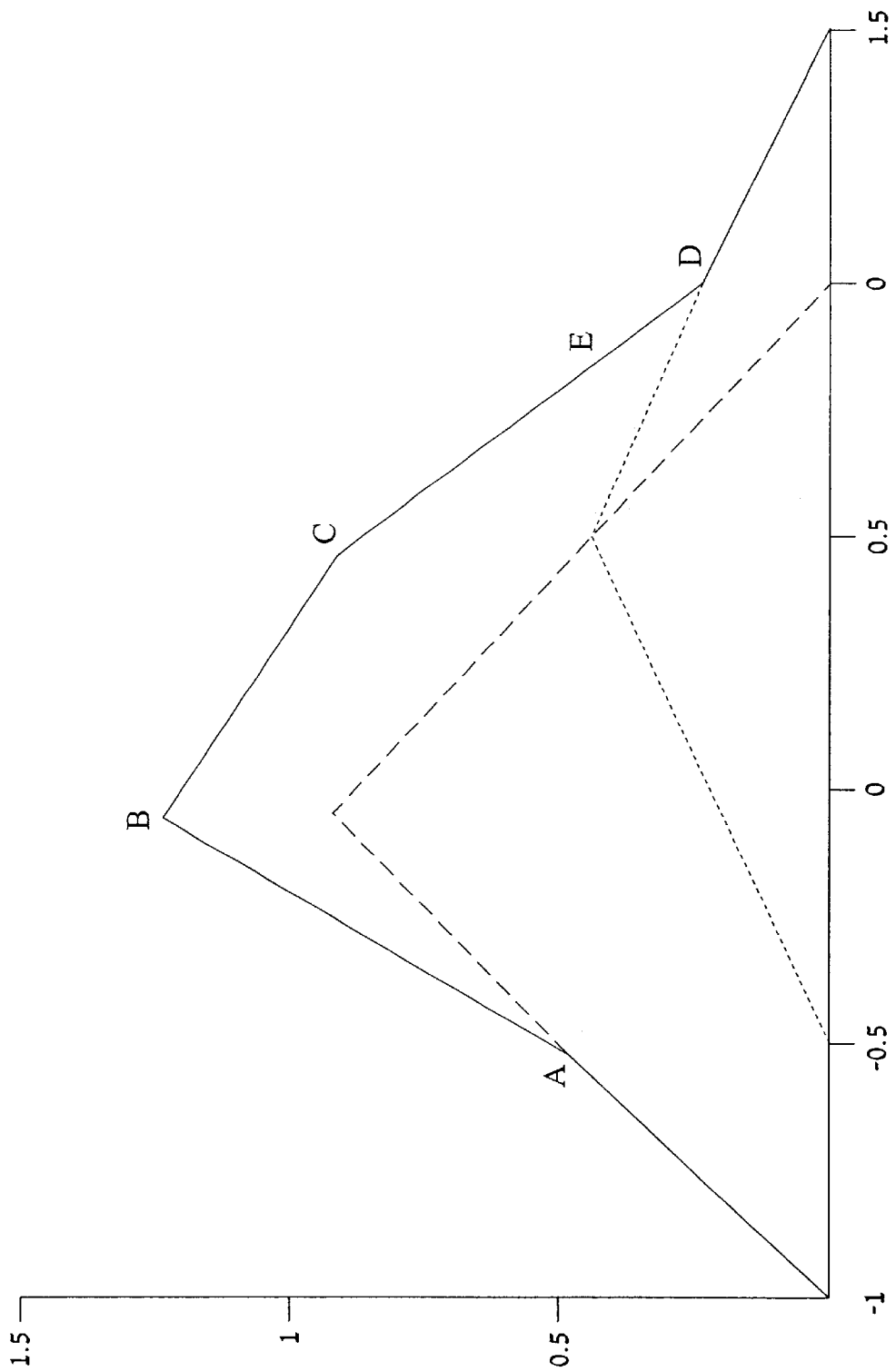
Figure 7:
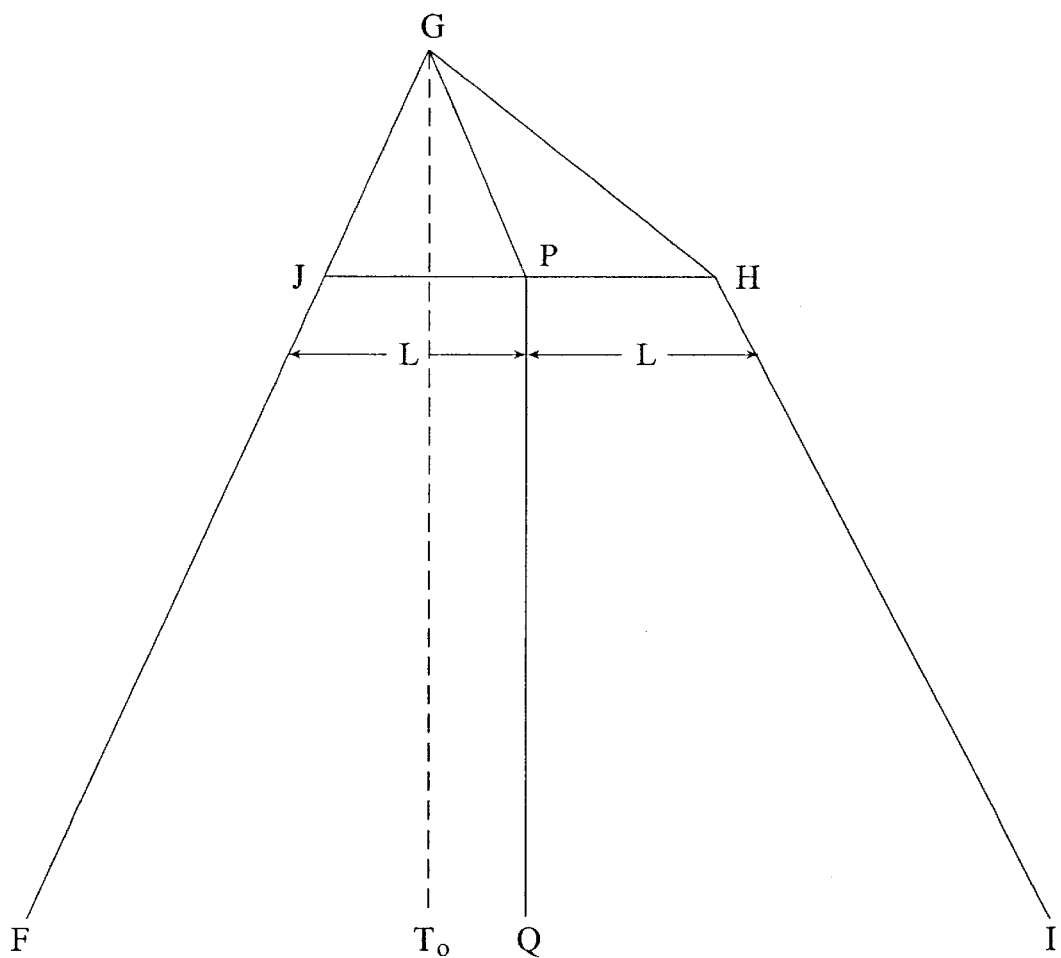
Figure 8:
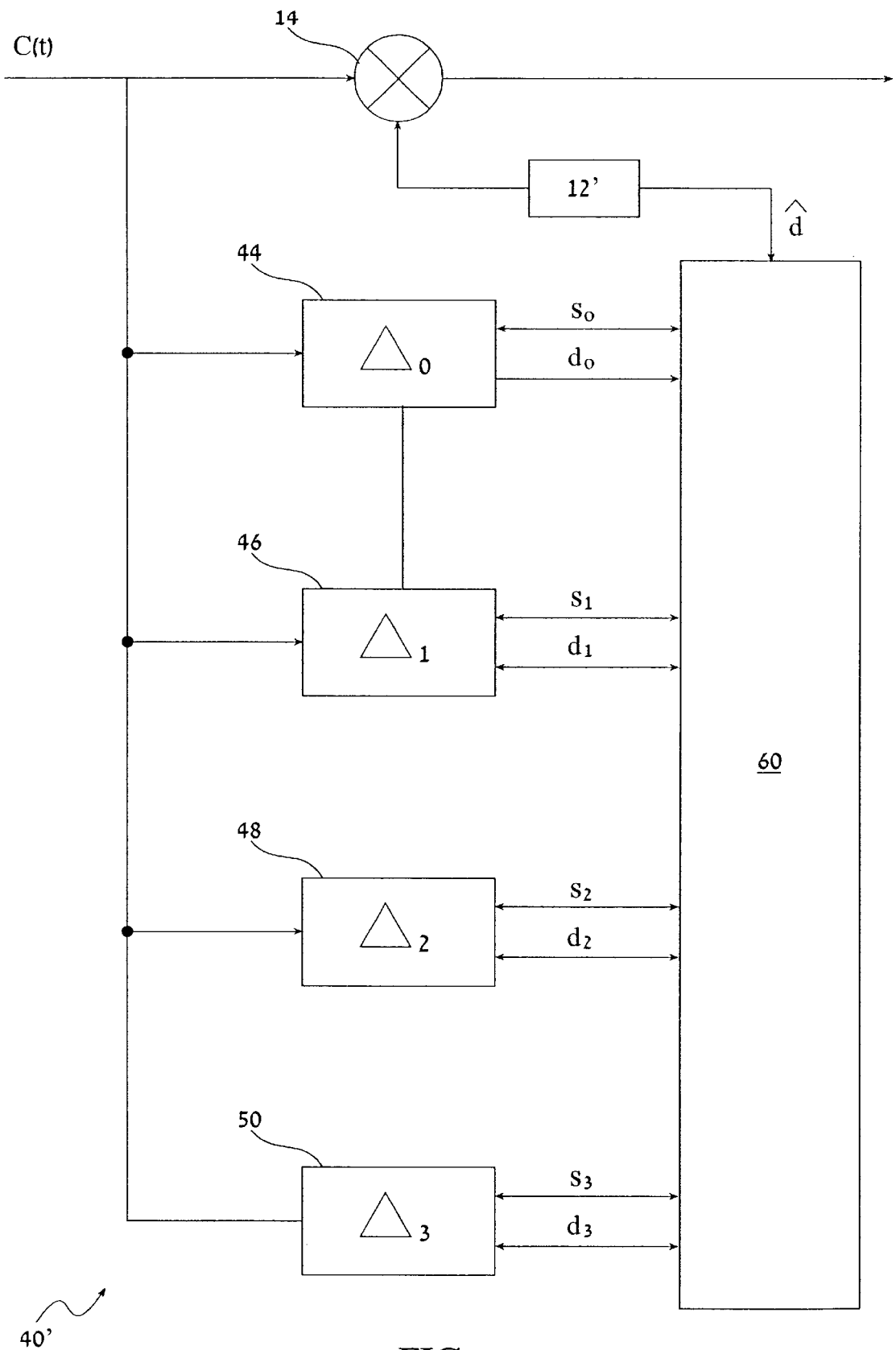

FIGS. 5A and 5B illustrate the motivation of the preferred algorithm for adjusting code phase signals $d_k$, k>0, on the basis of $d_{k-1}$. The principal behind the algorithm is that the correlation function between the incoming signal and the pseudorandom noise code has to be a single-valued function. Because of systematic effects such as multipath propagation, real correlation functions are not symmetric, like the ideal correlation function of FIG. 1, but are asymmetric, as shown in FIG. 5A. When DLL 44 has converged to code lock, the early and late correlators of DLL 44 produce identical correlations, so the corresponding points on the correlation function are those labeled "E" and "L" at the two ends of horizontal line 130, spaced $2\Delta_0 = T_c$ apart. Similarly, when DLL 46 has converged to code lock, the early and late correlators of DLL 46 produce identical correlations, so the corresponding points on the correlation function are those labeled "E" and "L" at the two ends of horizontal line 132, spaced $2\Delta_1 < T_c$ apart. The code phase signal $d_0$ output by DLL 44 corresponds to the projection 134 onto the abscissa (time axis) of the midpoint of line 130. The code phase signal $d_1$ output by DLL 46 corresponds to the projection 136 onto the abscissa of the midpoint of line 132. Because line 132 is shorter than line 130 and the correlation function is single valued, code phases 134 and 136 must differ by less than $\Delta_0 - \Delta_1$. For code phases 134 and 136 to differ by more than $\Delta_0 - \Delta_1$, the correlation function must be multivalued, as shown in FIG. 5B, which is mathematically impossible.

Therefore, the code phase signals are adjusted as follows. In a transparent change of notation, let $d_k$ represent the k-th code phase itself, for the k-th DLL of the hierarchy, rather than a signal representative of the k-th code phase. Let $S_k$ represent the k-th set of state variables. The algorithm is as follows:

IF $(d_k - d_{k-1} > \Delta_{k-1} - \Delta_k)$ THEN
    $d_k := d_{k-1} + (\Delta_{k-1} - \Delta_k)$
    $s_k := s_{k-1}$
ELSE IF $(d_k - d_{k-1} < \Delta_k - \Delta_{k-1})$ THEN
    $d_k := d_{k-1} - (\Delta_{k-1} - \Delta_k)$
    $s_k := s_{k-1}$
ELSE
    (leave $d_k$ and $s_k$ unchanged)
END IF The notation ":=" means replacement. If $d_k$ is so different from $d_{k-1}$ that such a difference is mathematically impossible, it is assumed that the k-th DLL has lost code lock, and $d_k$ is replaced by the extreme value permitted mathematically on the basis of $d_{k-1}$. If $d_k$ is unreliable, $s_k$ is presumed to also be unreliable, and is replaced by $s_{k-1}$.

It is to be understood that the receiver of the present invention includes more components than are described herein. The discussion herein focuses on the components needed for code tracking. All the other components of a receiver of the present invention, for example, the front end that acquires and demodulates the incoming signal to produce input signal C(t), and the navigational back end that uses the output of the DLL hierarchy of the present invention, are substantially identical to their counterparts in prior art receivers. It will be obvious to one ordinarily skilled in the art how to interpolate the DLL hierarchy of the present invention into a conventional navigational receiver.

While the invention has been described with respect to a limited number of embodiments, it will be appreciated that many variations, modifications and other applications of the invention may be made.

What is claimed is:

1. A receiver for receiving an incoming signal that is modulated with a code, the incoming signal including a plurality of chips of a certain chip duration, comprising:
    a plurality of delay lock loops, one of said delay lock loops being a first delay lock loop, said delay lock loops being organized hierarchically, such that each of said delay lock loops other than said first delay lock loop has a preceding delay lock loop, each of said delay lock loops including:
        (a) a code generator for generating the code,
        (b) a mechanism for generating a control signal representative of a timing mismatch between the incoming signal and the code generated by said code generator, and
        (c) a mechanism for transforming said control signal into a code phase signal which is applied to said code generator to reduce said timing mismatch;
    and wherein, in each of said delay lock loops other than said first delay lock loop, said code phase signal is adjusted according to both said control signal and said code phase signal of said preceding delay lock loop.

2. The receiver of claim 1, wherein, for each of said delay lock loops, said mechanism for generating a control signal representative of said timing mismatch includes an early correlator and a late correlator, for correlating the incoming signal with the code, said correlation performed by said early correlator being advanced in time relative to said correlation performed by said late correlator by a certain multiple of the chip duration; and wherein, for each of said delay lock loops other than said first delay lock loop, said multiple is smaller than said multiple of said preceding delay lock loop.

3. The receiver of claim 2, wherein, for each of said delay lock loops other than said first delay lock loop, said mechanism for transforming said control signal into said code phase signal transforms said control signal into a preliminary code phase signal which then is compared to said code phase signal of said preceding delay lock loop.

4. The receiver of claim 3, wherein, for each of said delay lock loops other than said first delay lock loop, if said preliminary code phase signal is greater than said code phase signal of said preceding delay lock loop by a certain threshold, said code phase signal of said each delay lock loop is set equal to said code phase signal of said preceding delay lock loop incremented by said threshold, and if said preliminary code phase signal is less than said code phase signal of said preceding delay lock loop by said threshold, said code phase signal of said each delay lock loop is set equal to said code phase signal of said preceding delay lock loop decremented by said threshold.

5. The receiver of claim 4, wherein, for each of said delay lock loops other than said first delay lock loop, said threshold is equal to a difference between one-half of said multiple of said chip duration for said preceding delay lock loop and one-half of said multiple of said chip duration for said each delay lock loop.

6. The receiver of claim 1, wherein, for each of said delay lock loops other than said first delay lock loop, said mechanism for transforming said control signal into said code phase signal transforms said control signal into a preliminary code phase signal which then is compared to said code phase signal of said preceding delay lock loop.

7. The receiver of claim 6, wherein, for each of said delay lock loops other than said first delay lock loop, if said preliminary code phase signal is greater than said code phase signal of said preceding delay lock loop by a certain threshold, said code phase signal of said each delay lock loop is set equal to said code phase signal of said preceding delay lock loop incremented by said threshold, and if said preliminary code phase signal is less than said code phase signal of said preceding delay lock loop by said threshold, said code phase signal of said each delay lock loop is set equal to said code phase signal of said preceding delay lock loop decremented by said threshold.

8. The receiver of claim 1, wherein said mechanism for transforming said control signal into said code phase signal includes a loop filter.

9. A method for tracking an incoming signal including a plurality of chips of a certain chip duration, comprising the steps of:
  (a) generating a plurality of instances of a code, said instances being ordered hierarchically, one of said instances being a first instance, such that for each of said instances other than said first instance, there is a preceding instance;
  (b) for each of said instances, producing a control signal representative of a timing mismatch between the incoming signal and said instance; and
  (c) for each of said instances, transforming said control signal into a code phase signal, said code phase signal of each of said instances other than said first instance being adjusted according to both said control signal and said code phase signal of said preceding instance.

10. The method of claim 9, wherein, for each of said instances, said generating includes applying said code phase signal to reduce said timing mismatch.

11. The method of claim 9, wherein said producing of said control signal is effected by correlating the incoming signal with said code to produce an early correlation and a late correlation, said early correlation being advanced in time relative to said late correlation by a certain multiple of the chip duration; and wherein, for each of said instances other than said first instance, said multiple is less than said multiple associated with said preceding instance.

12. The method of claim 1, wherein said control signal is a difference between said early correlation and said late correlation.

13. The method of claim 11, wherein, for each of said instances other than said first instance, said transforming of said control signal into said code phase signal is effected by steps including:
  (i) transforming said control signal into a preliminary code phase signal;
  (ii) comparing said preliminary code phase signal with said code phase signal of said preceding instance; and
  (iii) if said preliminary code phase signal deviates from said code phase signal of said preceding instance by a deviation, an absolute value whereof exceeds a certain threshold, using a function of said code phase signal of said preceding instance as said code phase signal of said each instance.

14. The method of claim 13, wherein said function is a sum of said code phase signal of said preceding instance and a product of said threshold with a sign of said deviation.

15. The method of claim 14, wherein, for each of said instances other than said first instance, said threshold is equal to a difference between one-half of said multiple of said chip duration for said preceding instance and one-half of said multiple of said chip duration for said each instance.

16. The method of claim 9, wherein, for each of said instances other than said first instance, said transforming of said control signal into said code phase signal is effected by steps including:
  (i) transforming said control signal into a preliminary code phase signal;
  (ii) comparing said preliminary code phase signal with said code phase signal of said preceding instance; and
  (iii) if said preliminary code phase signal deviates from said code phase signal of said preceding instance by a deviation, an absolute value whereof exceeds a certain threshold, using a function of said code phase signal of said preceding instance as said code phase signal of said each instance.

17. The method of claim 16, wherein said function is a sum of said code phase signal of said preceding instance and a product of said threshold with a sign of said deviation.

18. The method of claim 9, wherein said transforming of said control signal into said code phase signal is effected using a loop filter.

* * * * *